US009119216B2

(12) United States Patent
Berberana Fernandez-Murias et al.

(10) Patent No.: US 9,119,216 B2
(45) Date of Patent: Aug. 25, 2015

(54) METHOD AND NETWORK ENTITY FOR RESOURCE ALLOCATION IN MOBILE RADIO COMMUNICATION NETWORKS

(75) Inventors: Ignacio Berberana Fernandez-Murias, Madrid (ES); Avelina Vega Novella, Madrid (ES); Luis Miguel Del Apio Recio, Madrid (ES)

(73) Assignee: TELEFONICA, S.A. (ES)

( * ) Notice: Subject to any disclaimer, the term of this patent is extended or adjusted under 35 U.S.C. 154(b) by 94 days.

(21) Appl. No.: 13/638,626

(22) PCT Filed: Jun. 1, 2010

(86) PCT No.: PCT/EP2010/057588
§ 371 (c)(1),
(2), (4) Date: Oct. 19, 2012

(87) PCT Pub. No.: WO2011/120594
PCT Pub. Date: Oct. 6, 2011

(65) Prior Publication Data
US 2013/0083755 A1 Apr. 4, 2013

(30) Foreign Application Priority Data

Mar. 31, 2010 (ES) .................................. 201030490

(51) Int. Cl.
*H04W 72/08* (2009.01)
(52) U.S. Cl.
CPC ............ *H04W 72/085* (2013.01); *H04W 72/08* (2013.01)
(58) Field of Classification Search
CPC ......................................... H04W 72/00–72/087
USPC ........................... 370/329–338; 455/450–456
See application file for complete search history.

(56) References Cited

U.S. PATENT DOCUMENTS 7,917,176 B2 * 3/2011 Khojastepour et al. ..... 455/562.1
2008/0013610 A1 * 1/2008 Varadarajan et al. ......... 375/221
(Continued)

FOREIGN PATENT DOCUMENTS

CN          101064577 A     10/2007

OTHER PUBLICATIONS

3rd Generation Partnership Project: Technical Specification Group Radia Access Network; Physical layer aspects for evolved Universal Terrestrial Radio Access, UTRA Release 7, pp. 1-132, XP050369161.
International Search Report; International Application No. PCT/EP2010/057588; International Application Filing Date Jun. 1, 2010; Mail date Apr. 11, 2010.
3rd Generation Partnership Project: Technical Specification Group Radia Access Network; evolved Universal Terrestrial Radio Access, (E-UTRA); User Equipment (UE) Radio Transmission and Reception, Mar. 30, 2010, pp. 1-166, XP050402140.
(Continued)

*Primary Examiner* — Brandon Renner
(74) *Attorney, Agent, or Firm* — Cantor Colburn LLP (57) ABSTRACT

This invention proposes a method for assigning resources in the downlink based on the CQI parameter reported by the UE compatible with the LTE standard. The method looks for saving signalling resources when conditions are such that no major advantage can be obtained from frequency selective scheduling. The method is divided into two processes, a non real time process used to determine whether the conditions for its application are present; and the new assignment procedure. For the latter, the method defines different assignment procedures based on whether the CQI value reported by the UE is higher or not of a given threshold whose calculation is also defined. A new parameter, the MAB, is defined for the assignment in case of CQI higher than the threshold, while frequency distributed scheduling is used if it is lower. The proposed method is believed to improve the LTE spectral efficiency with reduced complexity.

18 Claims, 4 Drawing Sheets

(56) References Cited

U.S. PATENT DOCUMENTS

| | | | |
|---|---|---|---|
| 2008/0117867 A1* | 5/2008 | Yin et al. | 370/329 |
| 2008/0192847 A1* | 8/2008 | Classon et al. | 375/260 |
| 2008/0240030 A1* | 10/2008 | Kolding et al. | 370/329 |
| 2009/0175230 A1* | 7/2009 | Callard et al. | 370/329 |
| 2009/0274224 A1* | 11/2009 | Harris | 375/260 |
| 2010/0067479 A1* | 3/2010 | Choi et al. | 370/330 |
| 2010/0151876 A1* | 6/2010 | Park et al. | 455/452.2 |
| 2010/0195527 A1* | 8/2010 | Gorokhov et al. | 370/252 |
| 2010/0197314 A1* | 8/2010 | Maaref et al. | 455/450 |
| 2010/0233963 A1* | 9/2010 | Harada et al. | 455/63.3 |
| 2011/0044267 A1* | 2/2011 | Tamura | 370/329 |
| 2011/0117915 A1* | 5/2011 | Chang | 455/435.3 |
| 2011/0299490 A1* | 12/2011 | Nordstrom et al. | 370/329 |

OTHER PUBLICATIONS

Naveen Arulsenvan. "Reduced Feedback and Signaling Schemes for Sum-Rate Maximization in OFDMA systems", Wireless Communications and Networking Conference 2009, Apr. 5, 2009, pp. 1-6, XP031454433.

Texas Instruments, "CQI Feedback Reduction Scheme for E-Utra", 3GPP Draft; R1-074153 TI CQI Feedback, Oct. 2, 2007, XP050107685.

Xiaoxin Wu, "Low Overhead CQI Feedback in Multi-Carrier Systems", Global Telecommunications Conference, 2007, Globecom 07, Nov. 1, 2011, pp. 371-371, XP031196004.

Office Action Issued Nov. 21, 2014 Application No. 201080066656.3: pp. 8.

* cited by examiner

METHOD AND NETWORK ENTITY FOR RESOURCE ALLOCATION IN MOBILE RADIO COMMUNICATION NETWORKS

TECHNICAL FIELD OF THE INVENTION

The present invention relates to a method for allocating resources to a transmitter adapted to send data over a radio link. The resource element considered in this invention is the Physical Resource Block (PRB), which spans both the frequency and time domain in mobile radio communication networks, used in Orthogonal Frequency Division Multiplexing (OFDM) as specified by the 3rd Generation Partnership Project (3GPP) for Long Term Evolution (LTE) technology. The data are transmitted in Physical Resource Blocks, allocated by a radio base station (eNodeB in LTE) among its active users in accordance to quality reports from each User Equipment (UE) of said users.

BACKGROUND OF THE INVENTION

Long-Term Evolution ("LTE") is an effort to develop advanced wireless mobile radio technology that aims to succeed current Third Generation ("3G") telecommunication standards and technology for mobile networking. The actual standard is known as the International Telecommunication Union ("ITU") 3rd Generation Partnership Project ("3GPP"), Release 8, although the term LTE is often used to reference the standard. LTE is considered by many to be a Fourth Generation ("4G") technology, both because it is faster than 3G, and because, like the Internet, LTE uses a flat "all-IP" architecture where all information, including voice, is handled as data.

The LTE standard presently supports two modes of data allocation: localized and distributed. Localized transmission is intended for frequency selective scheduling (FSS), while distributed transmission is intended to maximize the amount of frequency diversity when sub-band channel knowledge is not available or out-of-date at the scheduler. The network entity usually in charge of resource scheduling is the base station defined in 3GPP LTE systems as an enhanced Node B (eNode B) for radio communication systems.

In order to improve the performance of the LTE systems, several improvements have been introduced in the standards, like the use of Orthogonal Frequency Division Multiplexing (OFDM) based techniques for the radio interface. OFDM is based on the fact that the different (orthogonal) sub-carriers may be used in parallel to transmit data over the air interface. The controllable radio resource in OFDM networks has three aspects: frequency, time and space. A Physical Resource Block ("PRB") is a set of time frequency resources whose size is the minimum resource allocation size. Each so-called PRB is defined by its frequency extension (180 kHz) and its time extension (0.5 ms), and data are transmitted over one or more PRBs consisting of a set of contiguous sub-carriers and having a predefined time extension. In the LTE standard, the generic frame structure is defined by 10 ms (10 milliseconds) frames, divided into ten 1 ms subframes, that are composed by two 0.5 ms slots. Resources are allocated in a per subframe basis. The minimum amount of resources allocated to an UE is two PRBs, each one transmitted over each slot of the subframe (the same amount of PRBs is assigned to a UE in the two slots of a subframe).

One of the advantages of using OFDM in the LTE radio interface is the possibility of supporting frequency selective scheduling based on the Channel Quality Index (CQI) reports provided by the User Equipment (UE) and the estimations performed by the eNodeB (based on the sounding reference signals sent by the UE to assist the network in allocation of appropriate frequency resources for uplink transmission). This feature takes advantage of the multipath propagation conditions that are common in mobile communications.

The performance of the LTE radio access technology is affected in environments where the LTE system is dimensioned (i.e., the number of base stations to be installed) attending to capacity requirements rather than coverage's ones, e.g., deployments in dense urban areas (with a high density of eNodeBs). In these environments the distance between macrocellular base stations (eNodeBs) is relatively small (as low as 150-200 meters), which results in propagation conditions with a higher proportion of Line of Sight (LoS) propagation (i.e., where there area no obstacles between the transmitting and receiving antennas that obstruct the radio link). It is considered that the sophisticated FSS mechanisms proposed for LTE are less effective in this kind of environments due to the fact that the coherence bandwidth of the propagation channels is relatively large with respect to the system bandwidth, reducing the opportunistic gain associated with this kind of algorithms. There are studies indicating that in a number of deployment scenarios where capacity, rather than coverage, may be the limiting factor, propagation conditions are such that coherence bandwidth is relatively large compared to the ones' considered in the usual propagation models employed for the evaluation of the standards by 3GPP, ITU-R, IEEE and other standardization bodies.

The coherence bandwidth is a statistical measurement of the range of frequencies over which the channel can be considered "flat", i.e., some of the signal's spectral components falling outside the coherence bandwidth will be affected differently (independently), compared with those components contained within the coherence bandwidth. Most of the evaluations of LTE scheduling algorithms are based on the use of standardized channel models that have a coherence bandwidth smaller than 1.5 MHz. However, estimations carried out in realistic simulation environments (using 3D cartography and real sites' locations) show that in some areas (LoS, border of the cell, . . . ) coherence bandwidth significantly exceeds this value.

In order to overcome these problems, there is the possibility of using transmit diversity technologies like Cyclic Delay Delivery (CDD), which provides transmit diversity without requiring the modification of the receiver and is supported in other OFDM systems like the digital television standard DVB-T. However, in the Release 8 of the LTE standard, this feature is only supported associated with the support of open loop spatial multiplexing and not as a pure transmission diversity procedure. But in some of the situations (e.g., cell borders), the use of MIMO spatial multiplexing techniques is not feasible.

SUMMARY OF THE INVENTION

The present invention serves to solve the aforesaid problem by providing ways of adapting and simplifying the scheduling procedures supported by the current LTE standard procedures and (in some situations such as in a fractional load regime, that is, the traffic demand is not enough to require the utilization of all the data transmission resources available) obtaining an increase of the capacity.

In the context of the invention, capacity is understood as the amount of frequency and time resources required to deliver certain amount of information.

The present invention is related to a method and an apparatus (network entity) for enhancing overall throughput in the LTE mobile communications system, wherein some flexibility in the scheduling of transmission times to users is possible and the network operates in the fractional load regime, by allocating resources in the radio link between the active users of an eNodeB (in any of the downlink and uplink or both) based on quality parameters (CQI) reported by the user (optionally, in addition to measurement reports from the eNodeB, e.g., the relative distance measured between said eNodeB and its neighbours).

This proposal is compatible with the simultaneous support of multiantenna technologies (MIMO) without modifications of the current standard.

The invention described here looks for saving signalling resources so that resources can be devoted to data transmission when it is estimated that no major advantage can be obtained from frequency selective scheduling (FSS).

In accordance with one aspect of the invention, there is provided a method for allocating frequency and time resources to transport data in PRBs over a radio link, through which one or more CQI reports (from one or more user equipments) are received (by a network entity typically implemented in a LTE eNode B). The method comprises the following steps:

For each value of the received CQI, associating an average maximum number $MAB_j$ of PRBs with a group j of adjacent values of said CQI, Determining a threshold CQI, $CQI_{thres}$, and for each selected UE, checking the value of its last CQI reported to compare it with the value $CQI_{thres}$, then:

if the last CQI value is higher than $CQI_{thres}$, the PRBs are allocated in a frequency selective scheduling (FSS) using the average maximum number $MAB_j$ associated with said CQI;

if the last CQI value is lower or equal than the $CQI_{thres}$, the PRBs are allocated in a frequency diversity scheduling (FDS) using the average maximum number $MAB_j$ associated with said CQI.

Thus, the steps of the method for allocating resources in terms of PRBs can be described dividing it into two main processes:

A non real time (NRT) process to determine whether the new way of PRB assignment should be used or a conventional one (like proportional fair) is preferable. This NRT process provides two basic output parameters to be used in each subframe allocation process: $CQI_{thres}$ and MAB.

A real time (RT) process allocating resources per subframe (typically, 1 ms period). This RT process determines whether frequency selective or frequency distributed scheduling should be applied comparing the CQI reported by the selected UE (chosen by means of a standard ranking function) with the $CQI_{thres}$ parameter. A set of rules are defined on how resources have to be allocated based on the comparison of the required PRBs (to be allocated) with the MAB parameter and the order a given UE is allocated in a subframe (i.e., whether it is the first UE to be assigned resources or not).

In case that frequency selective scheduling is selected by the eNodeB based on the aforementioned parameters, one of two possible scheduling modes of operation can be selected: proportional fair scheduling and opportunistic scheduling. The proportional fair scheduling requires that a compromise is reached in order to provide users with a minimum level of service whilst optimizing the use of the radio resources, so the scheduling process takes into account the historical data rate of each UE that attempts to transmit. In the opportunistic scheduling, the only criteria used is the maximization of the transmitted bit rate (i.e., assigning the resources to the UE with the higher CQI).

In accordance with a further aspect of the invention, there is provided a network entity, which is implemented in a base station (enhanced Node B for a LTE network) and comprises processing means for performing the method described before.

In accordance with a last aspect of the invention, it deals with a computer program comprising program code means which execute the method described before, when loaded into processing means of a network entity as defined above.

The main advantages of the invention can be listed here:
Adaptation of the scheduling mechanisms in LTE to the operating conditions characteristics of many implementation scenarios, i.e., dense urban areas where propagation conditions do not yield high delay spread.
Lower complexity and lower susceptibility to channel estimation errors.
Interference time diversity for cell edge UEs.
Reduced complexity of the allocation procedure.
Smooth transition towards a full frequency selective scheduling algorithm as the system approaches full load.
As trying to minimize the number of UEs allocated per slot, the blocking probability at the Physical Downlink Control Channel (PDCCH) channel is reduced.

DESCRIPTION OF THE DRAWINGS

To complete the description that is being made and with the object of assisting in a better understanding of the characteristics of the invention, in accordance with a preferred example of practical embodiment thereof, accompanying said description as an integral part thereof, is a set of drawings wherein, by way of illustration and not restrictively, the following has been represented.

DETAILED DESCRIPTION OF THE INVENTION

Figure 1:
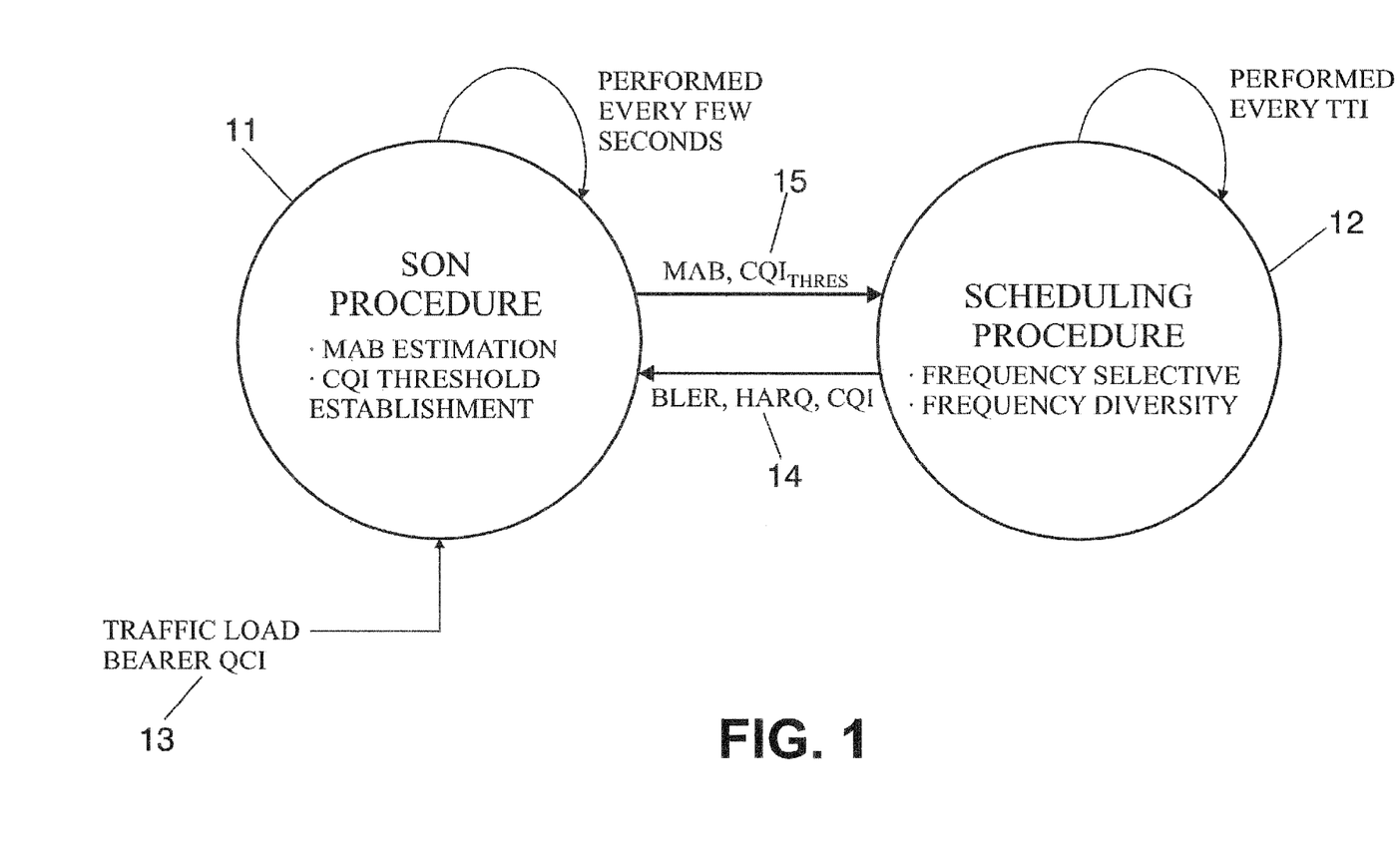
FIG. 1.—It shows a flow chart of the method for allocating resources, according to a possible embodiment of the invention, split into a non real time process and a radio resource management process.

The proposed method of resource allocation in OFDM networks supporting LTE is split into two main processes, as shown in FIG. 1: There is a non real time process (11) in charge of determining whether the assignment of resources according to the object of the invention provides an advantage and checking whether the conditions for its application are present, and then, there is a real time scheduling process (12) that performs the resource assignment itself to the UEs. Whilst the first process may be considered as a Self Organizing Network feature, the second one is radio resource management process. Both can be implemented in an eNodeB and operate in a different temporal scale, in a similar way as, for example, open loop and closed loop power control procedures in UMTS.

The LTE standard assigns the eNodeB with the responsibility of scheduling the radio resources among the different users, for both uplink and downlink, on a subframe basis, i.e., every 1 millisecond according to the standard. Scheduling instructions are sent in the PDCCH channels over the three first symbols of each subframe, using one, two or three symbols depending on the amount of scheduling information to be transmitted and the radio resources required for each message. Reducing the number of symbols employed, e.g., from 3 to 2, may result in a mean increase of the capacity in terms of radio resources available of 1/14 or 2/14, slightly higher if the Reference Signals are taken into account.

It is well known that, under the standard conditions for evaluation, the higher the granularity of the resources to be assigned, the higher the capacity that can be achieved. However, the larger the coherence bandwidth, or the smaller the delay spread, the lower the loss due to the lower granularity of the resources assignment.

The proposed method for allocating resources is intended to reduce the requirements of resources for the common control channels without significantly compromising the efficiency of the frequency selective scheduling (FSS) procedure employed in LTE.

The main objective of the non real time process (11) is to determine the average maximum bandwidth MAB, in terms of PRBs, to be used in the real time scheduling process (12), each value $MAB_j$ is associated with different CQI values reported by the UE. This estimation is mainly based on reports from the UEs and measurements (13) from the eNodeB, such as measured traffic load and bearer QoS Class Identifier (QCI). But other sources of information may be used to determine this average maximum bandwidth $MAB_j$, which is associated with the coherence bandwidth of the propagation channel, as for example, the relative distance between the eNodeB sites, considering that the closer they are, the larger the coherence bandwidth, on average terms. For these purposes, the eNodeB collects the statistics of the CQIs reported by the UEs and received them both in periodic and aperiodic way.

There are several ways for reporting the CQI supported by the LTE standard, with different levels of granularity for the characterization of the frequency domain and different levels of accuracy in the selection of the modulation and coding scheme. In each case, the average maximum bandwidth refers to the number of PRBs that have a similar CQI value and are more or less adjacent, i.e., they are relatively close in the frequency domain, separated by less than 400 kHz. For example, for the CQI periodic reporting, the coherence bandwidth may be associated with the sub-band that has a higher CQI reported or with two sub-bands from different bandwidth parts if they are adjacent. In the case of aperiodic CQI reporting, if using the eNobeB configured sub-band mode, the coherence bandwidth may be estimated as those sub-bands which have a similar CQI (e.g., their maximum difference is one) and are adjacent to each other.

The outcome of the non real time process (11) is that the eNodeB fixes a Maximum Assignment Bandwidth MBA, associated with each group j of CQI values which are equal or adjacent to value $CQI_i$, 15≥i≥0. This associated $MBA_j$ value is an estimation of the coherence bandwidth in PRBs obtained with the procedures defined before. The eNodeB can continuously adapt the value of the MAB in order to meet some minimum quality requirements defined by quality parameters (14) such as BLER and HARQ. If the BLER associated with this MAB/CQI pair exceeds an objective value (in principle, it should be 10%, but it can be adapted), then the value of the MAB should be reduced, e.g., by one PRB.

Figure 2:
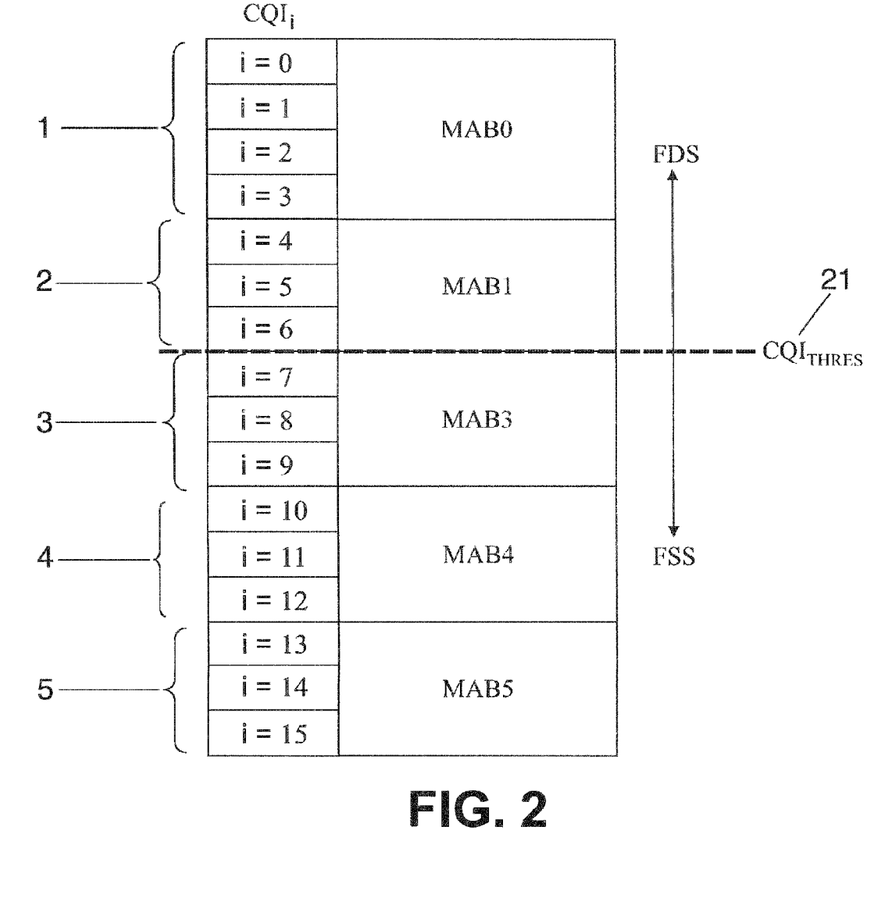
FIG. 2.—It shows a schematic representation of a mapping between channel quality indicators and maximum bandwidth parameters in terms of physical resource blocks, according to a possible embodiment of the invention.

The outcome (15) of the non real time process (11) is the mapping between CQI values and MAB values depicted in FIG. 2, as described before, and a threshold value $CQI_{thres}$ of channel quality indicator determined as explained below.

The non real time process (11) determines the CQI threshold parameter (21) used to establish the scheduling mechanism to be used. This parameter is estimated from the CQI distribution of active bearers and current load at the eNodeB, the load measured as the percentage of resources used for current data transmission.

As determining a threshold value $CQI_{thres}$ (21), the channel quality indicators reported by the UEs and received by the eNodeB can be classified into higher channel quality indicators if their values are higher than the threshold $CQI_{thres}$ and into lower channel quality indicators if their values are lower or equal than the threshold $CQI_{thres}$ (i.e., CQIs of cell-edge users).

If D is the average data demand in bits per subframe, the threshold can be estimated by the equation:

$$D \le \sum_{i=0}^{15} UE(CQI_i) \cdot C(CQI_i) \cdot U(CQI_i)$$

In the equation, UE(CQIi) is the average proportion of UEs that report a given value of CQI, C is the capacity per subframe associated to that CQI and U(CQIi) is the utilization factor associated with the value $CQI_i$. It is understood that for CQI values equal or higher than the threshold $CQI_{thres}$, the utilization factor is close to 1, leaving some room for dealing with retransmissions, if they are not accounted for in the capacity term or the necessity of including padding bits. $U(CQI_i)=1$ when $CQI_i \ge CQI_{thres}$. And for CQI values which are lower than the threshold $CQI_{thres}$, $U(CQI_i)<1$; in a preferred embodiment of the invention, a utilization factor of ⅓ is assumed. The capacity term C can be also be obtained from measurements carried out by the eNodeB.

Thus, $CQI_{thres}$ is the lowest CQI value that allows the above equation to be fulfilled.

For this calculation the number of symbols per subframe reserved for the control channels (which cannot be used for data transport) is either assumed to be 3 or is taken from measurements performed by the eNodeB. Additionally, the power to be used for each scheduling mode is determined, lower for FS and higher for FD, in order to provide some interference control.

Figure 3:
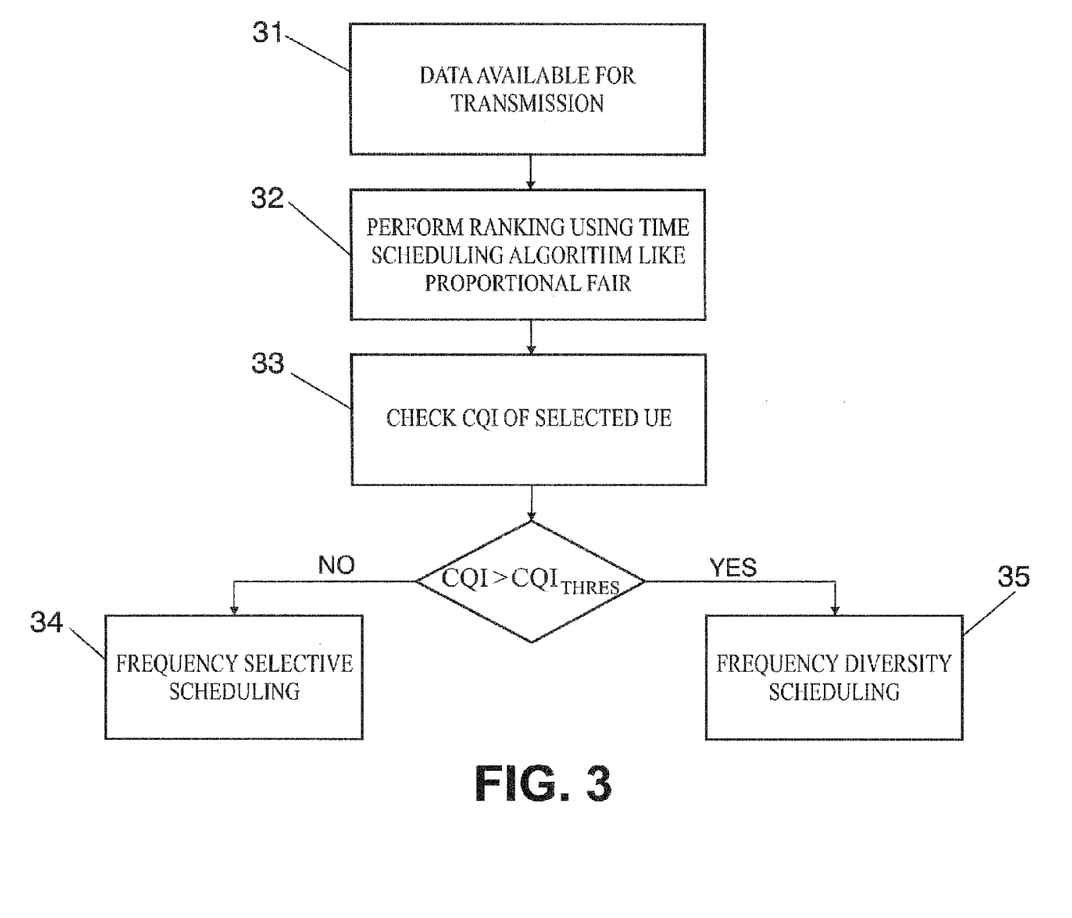
FIG. 3.—It shows a flow chart of the radio resource management method for allocating resources, according to a possible embodiment of the invention.

In parallel, when there is data to be sent to or from the UEs, the eNodeB activates the RRM scheduling procedure, shown in FIG. 3. The case considered here is the transmission of data in the downlink, although similar principles may also be applied to the uplink.

In a given subframe, the eNodeB selects the first UE to be served using a standard ranking algorithm (32) like proportional fair time scheduling. Based on the last received CQI from this selected UE whose reported CQIs are checked (33), it selects the scheduling mode to be used: FSS (34) is frequency selective scheduling, or FDS (35) which is frequency diversity scheduling Frequency selective scheduling (FSS) is reserved for users with a higher CQI, whilst frequency diversity (FDS) is used for cell edge users. Depending on the mode selected, all the resources of the subframe are initially assigned to the selected mode (i.e., in a given subframe there are, in principle, only UEs using a given scheduling mode).

Figure 4:
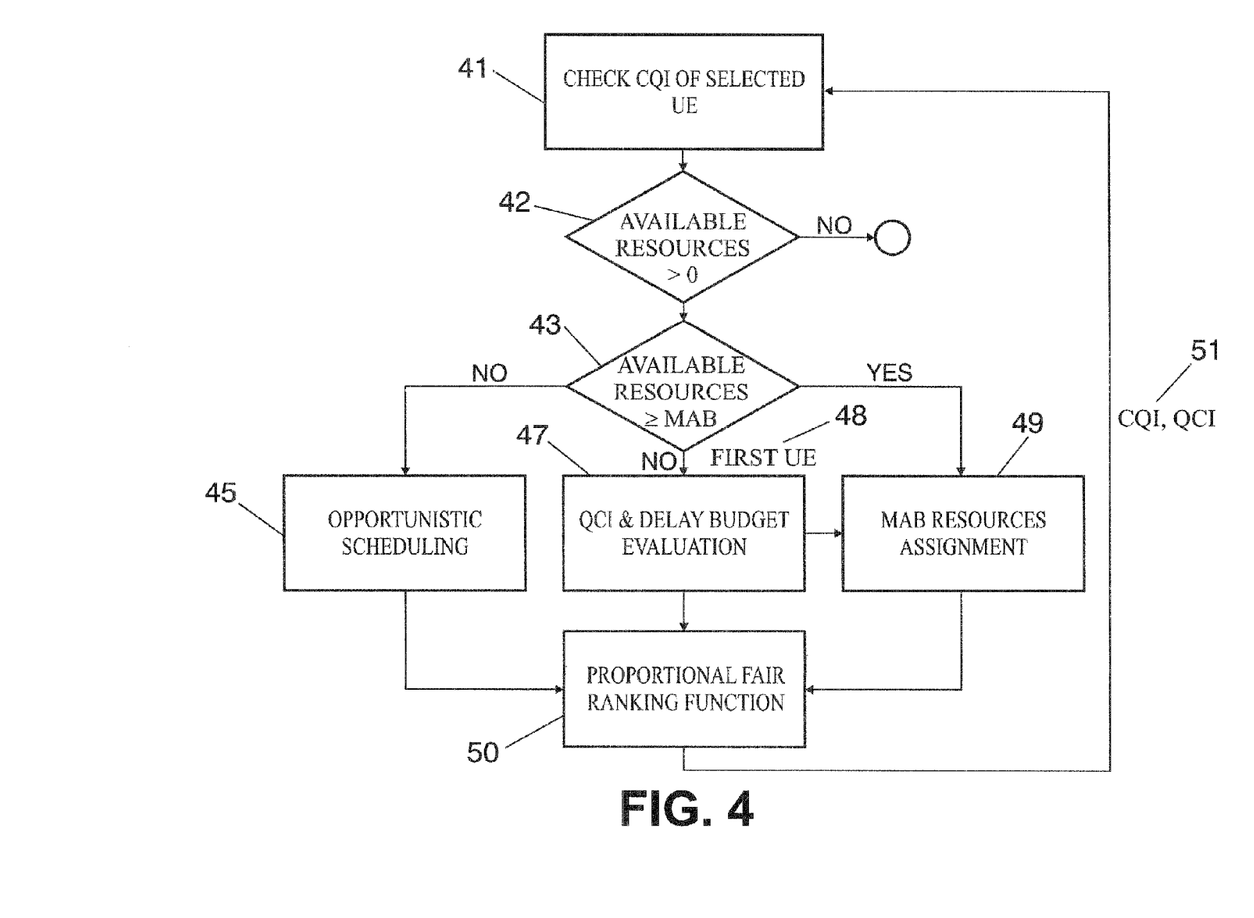
FIG. 4.—It shows a flow chart of the radio resource management method for allocating resources using frequency selective scheduling, according to a possible embodiment of the invention.

For FSS mode, shown in FIG. 4, two modes of operation are contemplated: fair scheduling (50) and opportunistic scheduling (49). The eNodeB checks whether there are available resources (42) and if they are enough to meet the Maximum Assignment Bandwidth MBA determined by the non real time process (11).

By default, fair scheduling is used and resources assigned to the (not already attended) user with a higher value in the ranking algorithm (50). The transport block size is selected in order to occupy, if possible, the resources defined by the MAB. In case the amount of data to be transmitted exceeds the resources of the MAB, the block of information is partitioned and sent over different OFDM subframes. If the amount of data to be transmitted is not enough for filling up the resources of the MAB, the scheduler may take the decision of either assigning the required resources (49) or delaying the transmission (47) of the first selected UE (48) and look for another UE (next one in the classification of the used ranking function). The decision may be based on either the QCI of the bearer or the delay budget (47). Delaying the transmission does not severely affect the QoS of the connection if it corresponds to a non delay sensitive application, as the ranking algorithm (50) selects the non scheduled in a relative short period (in normal conditions, the longer the delay, the higher the value in the ranking function). The limit in the delay incurred is consistent, in any case, with the one indicated by the QCI of the bearer.

The scheduler, based on the CQI reported, selects the PRBs assigned to the UE as to complete the MAB, using localized allocation type 2. It may also correct the modulation and coding scheme to be used, modifying consequently the size of the transport block. The PRBs assigned should encompass (but could exceed) those that have been reported with a higher CQI by the UE.

After the first UE has been assigned resources, a second UE is selected based on the results of the ranking function whose CQI is associated with FS scheduling (UEs with CQI lower than $CQI_{thres}$ are not considered for allocation). This UE is preferably the one with preferred PRBs (those with higher CQI) fall into those available after first UE assignment. If possible, the scheduler assigns PRBs up to the bandwidth of MAB. If not feasible, the scheduler assigns the resources that provide larger capacity (i.e., moving towards an opportunistic scheduling mode).

In the opportunistic mode (45), the eNodeB looks for the UE backlogged, i.e., UEs with data to be transmitted that have not been allocated resources yet, which can support the higher bit rate in the PRBs available based on the CQIs reported, and assigns resources among them.

For FD scheduling mode (35), the scheduler of the eNodeB distributes the resources required by the selected user in order to take advantage of the interference diversity that may happen. Not all the resources (PRBs) available in the subframe are necessarily used, but only those compatible with the frequency reuse factor that is intended for UEs which are frequency diversity schedules (e.g., ⅓, so only ⅓ of the PRBs in the subframe should be assigned). Contrary to what happens with other interference coordination schemes, the PRBs to be assigned are not predefined. This level of reuse can be adjusted as a function of the data backlog for FDS UEs, meaning that more resources may be employed if the backlog becomes larger. The updating can be implemented on a per subframe basis, in order to overcome possible congestion problems.

An implementation of a method for assigning resources in the LTE downlink has been described. After the resources have been assigned using this method, the number of resources dedicated to the PDCCH channel is estimated. The sizes of the transport blocks to be transmitted are corrected in order to fit with the number of resource elements available if the number of symbols reserved for common control channels is different to the one used in the scheduling process.

Note that in this text, the term "comprises" and its derivations (such as "comprising", etc.) should not be understood in an excluding sense, that is, these terms should not be interpreted as excluding the possibility that what is described and defined may include further elements, steps, etc.

The invention claimed is:

1. A method for allocating resources to transport data in physical resource blocks over a radio link for a variety of user equipment in a long term evolution network, comprising:

receiving at least a channel quality indicator CQI reported from at least one of the variety of user equipment, for each value of the received channel quality indicators, associating an average maximum number $MAB_j$ of physical resource blocks with a group j of adjacent values of the received channel quality indicators, determining a threshold value $CQI_{thres}$ of channel quality indicator, selecting a user equipment from the variety of user equipment whose corresponding channel quality indicators have been received according to a ranking algorithm, checking the value of a last received channel quality indicator from the selected user equipment and:

if said value is higher than the threshold value $CQI_{thres}$, allocating physical resource blocks in a frequency selective scheduling using the average maximum number $MAB_j$ of physical resource blocks associated with said value in accordance with determining a frequency reuse factor assigned to the selected user equipment and filling a determined number of physical resource blocks lower or equal to the average maximum number $MAB_j$ with data to be transported belonging to the selected user equipment, being the determined number of physical resource blocks in accordance to the frequency reuse factor of said selected user equipment, wherein the frequency reuse factor is proportional to a data load calculated by summing up data load from all the user equipment whose reported channel quality indicators are lower or equal than the threshold value $CQI_{thres}$;

if said value is lower or equal than the threshold value $CQI_{thres}$, allocating physical resource blocks in a frequency diversity scheduling using the average maximum number $MAB_j$ of physical resource blocks associated with said value.

2. The method according to claim 1, wherein the allocating of the physical resource blocks in the frequency selective scheduling further comprises:

filling the average maximum number $MAB_j$ of physical resource blocks with data to be transported belonging to the selected user equipment.

3. The method according to claim 1, wherein the allocating of the physical resource blocks in the frequency selective scheduling further comprises:

filling the average maximum number $MAB_j$ of physical resource blocks with data to be transported belonging to the selected user equipment, if the data is enough to fill the average maximum number $MAB_j$ of physical resource blocks;

otherwise, delaying the data to be transported belonging to the selected user equipment and selecting another user equipment from the variety of user equipment.

4. The method according to claim 1, wherein the allocating of the physical resource blocks in the frequency selective scheduling further comprises:
using a scheduling mode of operation selected from proportional fair scheduling and opportunistic scheduling.

5. The method according to claim 1, wherein physical resource blocks are mapped to Orthogonal Frequency-Division Multiplexing subframes.

6. The method according to claim 1, wherein the data is to be transported in downlink.

7. The method according to claim 1, wherein the data is to be transported in uplink.

8. The method according to claim 1, wherein the selecting of the user equipment from the variety of user equipment according to the ranking algorithm,
wherein the ranking algorithm being a standard ranking algorithm that is proportional fair time scheduling and the user equipment being selected using the standard ranking algorithm.

9. A method for allocating resources to transport data in physical resource blocks over a radio link for a variety of user equipment in a long term evolution network, comprising:
receiving at least a channel quality indicator CQI reported from at least one of the variety of user equipment,
for each value of the received channel quality indicators, associating an average maximum number $MAB_j$ of physical resource blocks with a group j of adjacent values of the received channel quality indicators,
determining a threshold value $CQI_{thres}$ of channel quality indicator,
selecting a user equipment from the variety of user equipment whose corresponding channel quality indicators have been received according to a ranking algorithm,
checking the value of a last received channel quality indicator from the selected user equipment and:
if said value is higher than the threshold value $CQI_{thers}$, allocating physical resource blocks in a frequency selective scheduling using the average maximum number $MAB_j$ of physical resource blocks associated with said value;
if said value is lower or equal than the threshold value $_{CQIthres}$, allocating physical resource blocks in a frequency diversity scheduling using the average maximum number $MAB_j$ of physical resource blocks associated with said value,
wherein the threshold value $CQI_{thres}$ is determined by calculating a lowest value of channel quality indicator CQI that fulfils the following equation:

$$D \le \sum_{i=0}^{15} UE(CQI_i) \cdot C(CQI_i) \cdot U(CQI_i)$$

where D is an average data demand in bits per subframe, $UE(CQI_i)$ is an average proportion of user equipments reporting a given channel quality indicator value $CQI_i$, C is a measured capacity in bits per subframe assigned to the given channel quality indicator value $CQI_i$, and $U(CQI_i)$ is an utilization factor assigned to the given channel quality indicator value $CQI_i$, being $U(CQI_i)=1$ when $CQI_i \ge CQI_{thres}$ and $U(CQI_i)<1$ when $CQI_i<CQI_{thres}$.

10. A network entity implemented in an enhanced NodeB of a network supporting long term evolution characterized by comprising processing means configured to implement the method set out in claim 1.

11. A computer program product comprising program code stored on a non-transitory computer readable medium and executable by a processor to cause the processor to perform the method according claim 1.

12. A method for allocating resources to transport data in physical resource blocks over a radio link for a variety of user equipment in a long term evolution network, comprising:
receiving at least a channel quality indicator CQI reported from at least one of the variety of user equipment,
for each value of the received channel quality indicators, associating an average maximum number $MAB_j$ of physical resource blocks with a group j of adjacent values of the received channel quality indicators,
determining a threshold value $CQI_{thres}$ of channel quality indicator,
selecting a user equipment from the variety of user equipment whose corresponding channel quality indicators have been received according to a ranking algorithm, the ranking algorithm being a standard ranking algorithm that is proportional fair time scheduling and the user equipment being selected using the standard ranking algorithm,
checking the value of a last received channel quality indicator from the selected user equipment and:
if said value is higher than the threshold value $CQI_{thres}$, allocating physical resource blocks in a frequency selective scheduling using the average maximum number $MAB_j$ of physical resource blocks associated with said value in accordance with
determining a frequency reuse factor assigned to the selected user equipment and filling a determined number of physical resource blocks lower or equal to the average maximum number $MAB_j$ with data to be transported belonging to the selected user equipment, being the determined number of physical resource blocks in accordance to the frequency reuse factor of said selected user equipment wherein the frequency reuse factor is proportional to a data load calculated by summing up data load from all the user equipment whose reported channel quality indicators are lower or equal than the threshold value $CQI_{thres}$;
if said value is lower or equal than the threshold value $CQI_{thres}$, allocating physical resource blocks in a frequency diversity scheduling using the average maximum number $MAB_j$ of physical resource blocks associated with said value value,
wherein the threshold value $CQI_{thres}$ is determined by calculating a lowest value of channel quality indicator CQI that fulfils the following equation:

$$D \le \sum_{i=0}^{15} UE(CQI_i) \cdot C(CQI_i) \cdot U(CQI_i)$$

where D is an average data demand in bits per subframe, $UE(CQI_i)$ is an average proportion of user equipments reporting a given channel quality indicator value $CQI_i$, C is a measured capacity in bits per subframe assigned to the given channel quality indicator value $CQI_i$ and $U(CQI_i)$ is an utilization factor assigned to the given channel quality indicator value $CQI_i$ being $U(CQI_i)=1$ when $CQI_i \geq CQI_{thres}$ and $U(CQI_i)<1$ when $CQI_i < CQI_{thres}$.

13. The method according to claim 12, wherein the allocating of the physical resource blocks in the frequency selective scheduling further comprises:

filling the average maximum number $MAB_j$ of physical resource blocks with data to be transported belonging to the selected user equipment.

14. The method according to claim 12, wherein the allocating of the physical resource blocks in the frequency selective scheduling further comprises:

filling the average maximum number $MAB_j$ of physical resource blocks with data to be transported belonging to the selected user equipment, if the data is enough to fill the average maximum number $MAB_j$ of physical resource blocks;

otherwise, delaying the data to be transported belonging to the selected user equipment and selecting another user equipment from the variety of user equipment.

15. The method according to claim 12, wherein the allocating of the physical resource blocks in the frequency selective scheduling further comprises:

using a scheduling mode of operation selected from proportional fair scheduling and opportunistic scheduling.

16. The method according to claim 12, wherein physical resource blocks are mapped to Orthogonal Frequency-Division Multiplexing subframes.

17. The method according to claim 12, wherein the data is to be transported in downlink.

18. The method according to claim 12, wherein the data is to be transported in uplink.

* * * * *